No. 753,705.                                                    Patented March 1, 1904.

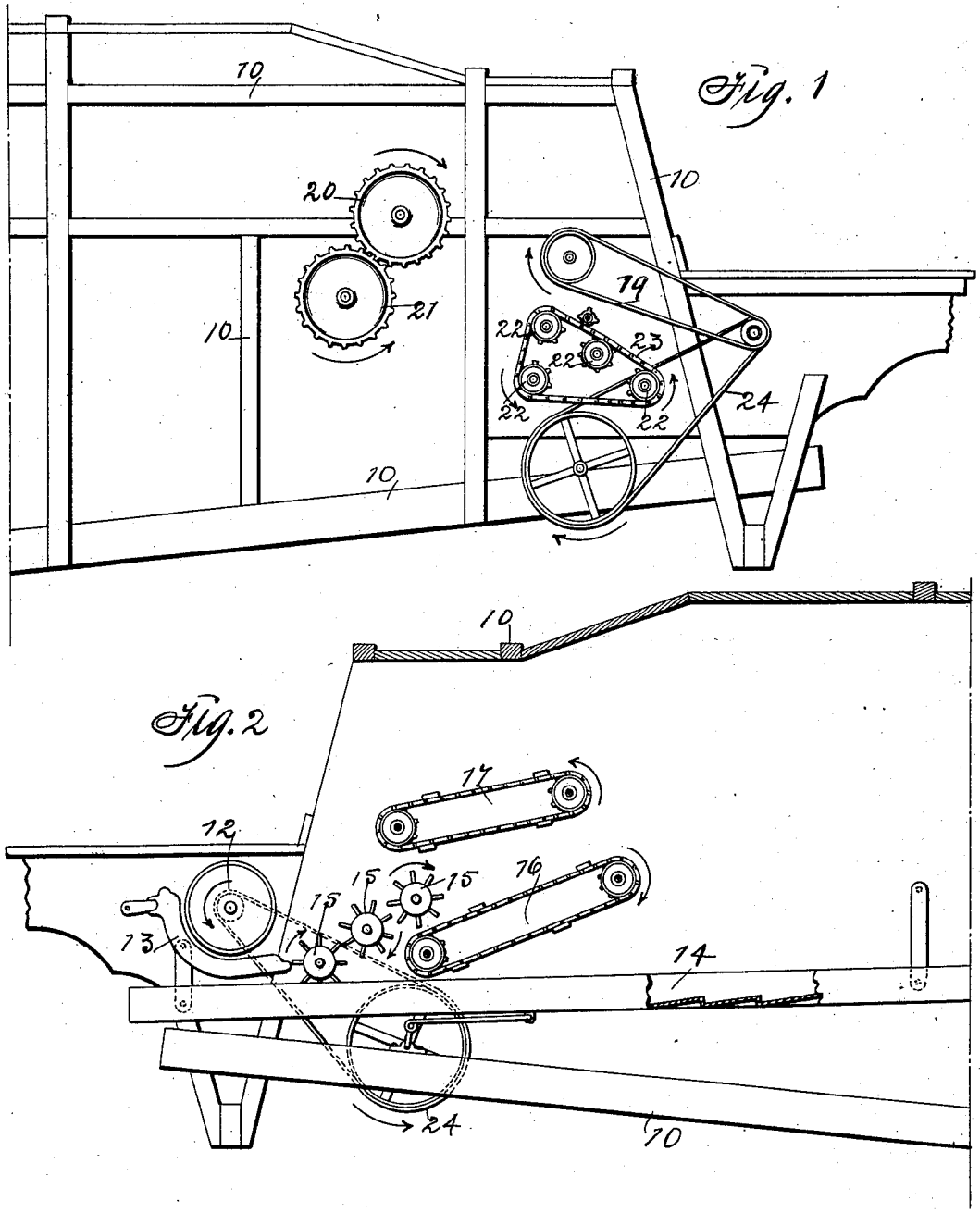

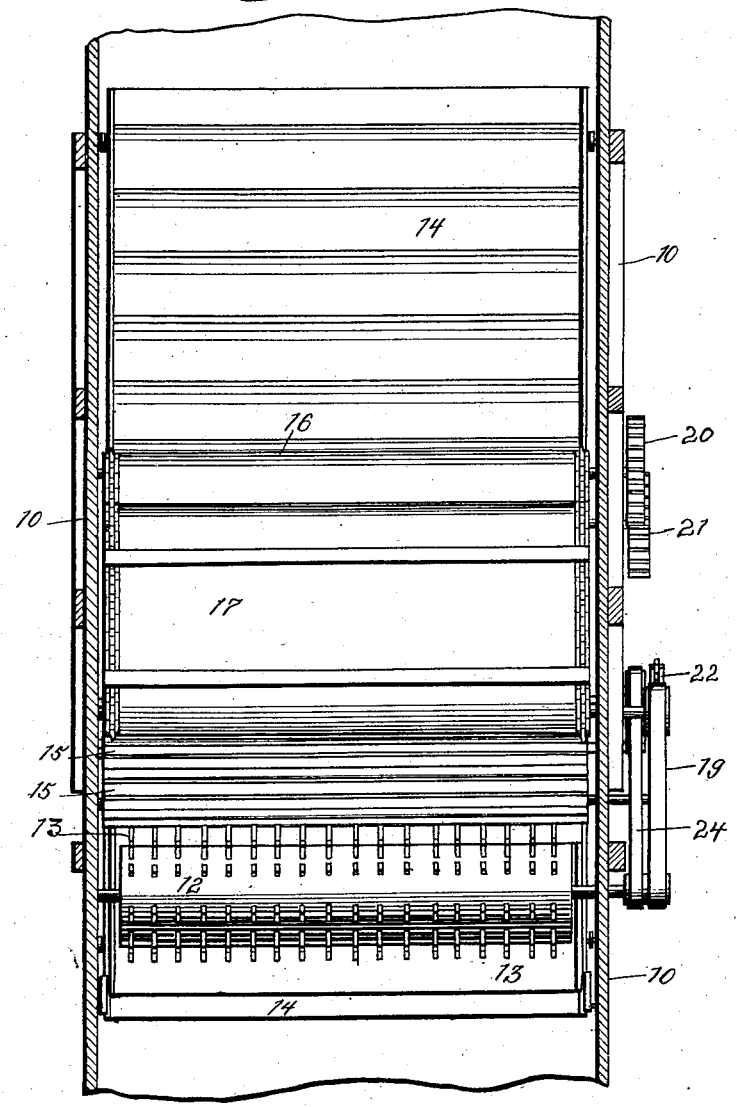

UNITED STATES PATENT OFFICE.

PETER HOFMANN, OF GREENFIELD, IOWA.

THRESHER AND SEPARATOR.

SPECIFICATION forming part of Letters Patent No. 753,705, dated March 1, 1904.

Application filed July 25, 1902. Serial No. 116,964. (No model.)

*To all whom it may concern:*

Be it known that I, PETER HOFMANN, a citizen of the United States, residing at Greenfield, in the county of Adair and State of Iowa, have invented a new and useful Improvement in Grain Threshers and Separators, of which the following is a specification.

My object is to thoroughly shake the straw as quick as it passes from the cylinder and concave of a threshing-machine in such a manner that the grain will fall from the straw upon a vibrating carrier and the straw will be elevated to pass upward and rearward between endless straw-carriers.

A further object is to utilize the mechanism for shaking the grain from the straw as it comes direct from the cylinder and concave for coacting with endless carriers to move the straw rearward and upward.

My invention consists in the arrangement and combination of parts as hereinafter set forth, pointed out in my claim, and illustrated in the accompanying drawings, in which—

Figure 1 is a side elevation of the front portion of a thresher and separator and shows how a plurality of toothed rollers and two endless carriers are connected with the cylinder as required to transmit power and motion from the cylinder-shaft to the rollers and endless carriers. Fig. 2 is a sectional view that shows the arrangement and combination of the ribbed rollers and endless carriers relative to each other, the cylinder and concave, and the vibrating grain-carrier. Fig. 3 is a plan view showing the forms and positions of the ribbed rollers relative to the concave, the lower endless carrier, and the vibrating carrier.

The numeral 10 designates the machine-frame; 12, the cylinder; 13, the concave, and 14 the vibratory grain-carrier.

A plurality of ribbed rollers 15 are journaled to the sides of the machine immediately in rear of the concave in a plane extending at an angle of about forty-five degrees upward and rearward. Each roller has a plurality of fins or ribs on its periphery that extend from end to end. As the rollers are rotated these ribs successively contact with the straw as it passes rearward from the cylinder and concave and move and stir the straw and aid in elevating and moving it rearward toward the endless carriers. The ribs also serve as means for striking and shaking the grain from the straw and chaff in such a manner that the grain will fall upon the rollers and lodge between the ribs and from thence be dropped upon the vibrating carrier suspended below the rollers and the straw forced into contact with endless carriers and elevators that extend upward and rearward in inclined planes, as shown in Fig. 2. The positions of the endless carriers relative to the series of ribbed rollers and to each other facilitates the upward-and-rearward movement of the straw and also compresses the straw to some extent after the grain has been shaken therefrom as required for advantageously advancing straw to a stack.

An endless carrier 16 is mounted in a plane below the rollers 15 and extends from below the rear and upper roller 15 upward and rearward.

A second endless carrier 17 is mounted in a plane above the rear and upper roller 15 and extends upward and rearward at a less degree of elevation than the lower carrier 16 in such a manner that their upper and rear ends will be closer together than their front and lower ends, as required to pack the straw in some degree as it passes through between the two endless carriers.

The vibrating grain-carrier 14 is suspended to extend from below the cylinder rearward to receive the grain as it is shaken from the straw by the toothed rollers 15 to fall upon the carrier.

The cylinder-shaft is connected with the roller at the front end of the upper endless carrier 17 by pulleys and a belt 19, and the upper and rear ends of the endless carriers 16 and 17 are connected by gear-wheels 20 and 21, and the rollers 15 are connected with the lower end of the carrier 16 by means of sprocket-wheels 22 and a chain 23, as shown in Fig. 1, or in any suitable way as required to operate the toothed rollers and endless carriers in concert with the cylinder.

It is obvious the combination of the cylinder and concave, a pair of endless belts having feed motion (i. e., having their contiguous surfaces moving in the same direction) and arranged to form a converging upwardly-conducting throat to receive the straw, and an upwardly-inclined series of ribbed rolls and extending from the discharge side of the concave into the throat formed by the belts produces a separator for the grain and a continuous carrier delivering the straw to the belts.

The vibrating grain-carrier 14 is connected with the cylinder by a belt 24.

Having thus described the purpose, construction, and operation of my invention, the practical utility thereof will be readily understood by persons familiar with the art to which it pertains; and

What I claim as new, and desire to secure by Letters Patent, is—

The combination of a cylinder and concave, a pair of endless belts having feed motion (i. e., having their contiguous surfaces moving in the same direction) and arranged to form a converging, upwardly-conducting throat to receive the straw and an upwardly-inclined series of ribbed rolls and extending from the discharge side of the concave into the throat formed by the belts, and forming a separator for the grain, and a continuous carrier delivering the straw to the belts as shown and described.

PETER HOFMANN.

Witnesses:
R. G. ORWIG,
THOMAS G. ORWIG.